(12) United States Patent
Frazier

(10) Patent No.: US 8,355,211 B2
(45) Date of Patent: Jan. 15, 2013

(54) OPTICAL LENS SYSTEMS

(75) Inventor: James Albert Frazier, Wingham (AU)

(73) Assignee: FM-Assets Pty Ltd, Sydney (AU)

( * ) Notice: Subject to any disclaimer, the term of this patent is extended or adjusted under 35 U.S.C. 154(b) by 600 days.

(21) Appl. No.: 12/063,530

(22) PCT Filed: Aug. 10, 2006

(86) PCT No.: PCT/AU2006/001138
§ 371 (c)(1),
(2), (4) Date: May 27, 2008

(87) PCT Pub. No.: WO2007/016744
PCT Pub. Date: Feb. 15, 2007

(65) Prior Publication Data
US 2008/0279542 A1    Nov. 13, 2008

(30) Foreign Application Priority Data

Aug. 11, 2005  (AU) ................................ 2005904334
Oct. 12, 2005  (AU) ................................ 2005905635
Nov. 3, 2005   (WO) ................ PCT/AU2005/001675
Apr. 28, 2006  (AU) ................................ 2006902230
Jun. 23, 2006  (AU) ................................ 2006903397
Aug. 9, 2006   (AU) ................................ 2006904322

(51) Int. Cl.
G02B 15/02   (2006.01)
G02B 7/02    (2006.01)
(52) U.S. Cl. ..................... 359/673; 359/829; 359/830
(58) Field of Classification Search ................ 359/673, 359/811, 819, 827–830
See application file for complete search history.

(56) References Cited

U.S. PATENT DOCUMENTS 4,009,928 A    3/1977   Back
4,171,872 A    10/1979  Baker
4,496,223 A    1/1985   Baker
(Continued)

FOREIGN PATENT DOCUMENTS
EP    0730167 A2    9/1996
(Continued)

OTHER PUBLICATIONS

Form PCT/ISA/210 (International Search Report) dated Nov. 8, 2006.
(Continued)

Primary Examiner — William Choi
(74) Attorney, Agent, or Firm — Opticus IP Law PLLC

(57) ABSTRACT

Optical lens attachments and cameras are disclosed. The attachment comprises a coupling mechanism for mating engagement with at least one of a camera and an optical lens. A barrel is coupled at one end to the coupling mechanism. A negative lens unit is coupled to the other end of elongated barrel. A diopter lens is disposed between the barrel and the coupling mechanism. The coupling mechanism, the diopter lens, and the barrel are aligned with an optical axis. Also disclosed is a double swivel optical system, comprising a negative lens unit, a mirror oriented at an angle to the optical axis of the negative lens unit, a roof prism for rotating incident light rays by 90 degrees and inverting an image, a rotation mechanism permitting rotation of the negative lens unit about a vertical axis, an image rotator comprising a prism that can invert an image, the prism disposed within the image rotator, and another rotation mechanism permitting rotation of the roof prism about an optical axis of the image rotator.

16 Claims, 8 Drawing Sheets

U.S. PATENT DOCUMENTS

| | | | |
|---|---|---|---|
| 4,798,437 | A | 1/1989 | Rediker et al. |
| 4,802,717 | A | 2/1989 | Kebo |
| 5,329,402 | A | 7/1994 | Sato |
| 5,632,718 | A | 5/1997 | Igarashi et al. |
| 5,721,585 | A | 2/1998 | Keast et al. |
| 5,727,236 | A | 3/1998 | Frazier |
| 5,748,371 | A | 5/1998 | Cathey, Jr. et al. |
| 5,781,236 | A | 7/1998 | Shinbori et al. |
| 5,808,726 | A | 9/1998 | Egawa et al. |
| 6,021,005 | A | 2/2000 | Cathey, Jr. et al. |
| 6,057,971 | A | 5/2000 | Mihara |
| 6,104,426 | A | 8/2000 | Street |
| 6,212,334 | B1 | 4/2001 | Weigel et al. |
| 6,307,683 | B1 | 10/2001 | Miyano |
| 6,361,491 | B1 | 3/2002 | Hasegawa et al. |
| 6,525,302 | B2 | 2/2003 | Dowski, Jr. et al. |
| 6,618,207 | B2 | 9/2003 | Lei |
| 6,842,297 | B2 | 1/2005 | Dowski, Jr. |
| 6,940,649 | B2 | 9/2005 | Dowski, Jr. |
| 7,215,493 | B2 | 5/2007 | Olmstead et al. |
| 7,564,498 | B2 | 7/2009 | Yamamoto |
| 7,808,718 | B2 | 10/2010 | Frazier et al. |
| 2002/0118457 | A1 | 8/2002 | Dowski, Jr. |
| 2002/0195538 | A1 | 12/2002 | Dowsk, Jr. et al. |
| 2002/0195548 | A1 | 12/2002 | Dowski et al. |
| 2002/0196980 | A1 | 12/2002 | Dowski, Jr. |
| 2003/0057353 | A1 | 3/2003 | Dowski et al. |
| 2003/0063384 | A1 | 4/2003 | Dowski et al. |
| 2003/0127584 | A1 | 7/2003 | Dowski et al. |
| 2003/0137750 | A1 | 7/2003 | Tsutsumi |
| 2003/0169944 | A1 | 9/2003 | Dowski et al. |
| 2003/0173502 | A1 | 9/2003 | Dowski et al. |
| 2004/0004766 | A1 | 1/2004 | Dowski, Jr. |
| 2004/0145808 | A1 | 7/2004 | Cathey et al. |
| 2004/0165253 | A1 | 8/2004 | Cathey et al. |
| 2004/0190762 | A1 | 9/2004 | Dowski et al. |
| 2004/0228005 | A1 | 11/2004 | Dowski, Jr. |
| 2004/0257543 | A1 | 12/2004 | Dowski et al. |
| 2005/0088745 | A1 | 4/2005 | Cathey et al. |
| 2005/0197809 | A1 | 9/2005 | Dowski et al. |
| 2005/0264886 | A1 | 12/2005 | Dowski, Jr. |
| 2006/0007551 | A1 | 1/2006 | Sakurai et al. |
| 2006/0050409 | A1 | 3/2006 | George et al. |
| 2006/0098097 | A1 | 5/2006 | Wach et al. |
| 2006/0164736 | A1 | 7/2006 | Olmstead et al. |
| 2006/0171041 | A1 | 8/2006 | Olmstead et al. |
| 2007/0223101 | A1 | 9/2007 | Sakamoto |
| 2007/0248343 | A1 | 10/2007 | Yamamoto |
| 2008/0279542 | A1 | 11/2008 | Frazier |
| 2010/0110275 | A1 | 5/2010 | Mathieu |

FOREIGN PATENT DOCUMENTS

| | | |
|---|---|---|
| EP | 1382987 A2 | 1/2004 |
| EP | 1389737 A1 | 2/2004 |
| EP | 1978394 | 10/2008 |
| JP | 61200519 A | 9/1986 |
| JP | 7318799 A | 12/1995 |
| JP | 10-039237 A | 2/1998 |
| JP | 2000131606 A | 5/2000 |
| JP | 3099615 | 4/2004 |
| JP | 2004-177435 A1 | 6/2004 |
| JP | 2004-341376 A | 12/2004 |
| JP | 2005-121714 A | 5/2005 |
| JP | 2006-243347 A | 9/2006 |
| WO | WO 97/21188 A1 | 6/1997 |
| WO | WO 99/57599 A1 | 11/1999 |
| WO | WO 03/021333 A1 | 3/2003 |
| WO | WO 2006/083486 A2 | 8/2006 |

OTHER PUBLICATIONS

Australian Examiner's First Report dated Jan. 19, 2011 on AU 2006279261.

Chinese First Office Action dated Mar. 6, 2009 on CN 2006800048729 and English Translation of Office Action.

Chinese Second Office Action dated Oct. 30, 2009 on CN 2006800048729 and English Translation of Office Action.

Chinese Third Office Action (Rejection Decision) dated Aug. 31, 2011 on CN 2006800048729 and English Translation of Office Action.

European Search Report dated Aug. 31, 2007 on EP 1978394 A1 (EP 07300936.7).

International Search Report (ISR) dated Sep. 28, 2006 on PCT/AU2006/001137.

International Preliminary Report on Patentability (IPER) dated Jan. 8, 2008 on PCT/AU2006/001137.

International Search Report dated Feb. 6, 2009 on WO 2008/122888 (PCT/IB2008/001304).

New Zealand Examination Report dated Oct. 19, 2009 on NZ566545.

U.S. Office Action dated Oct. 20, 2010 on U.S. Appl. No. 12/063,523.

U.S. Office Action dated Jun. 8, 2011 on U.S. Appl. No. 13/066.633.

P+S Technik Announcement on Skater Scope, "The first compact snorkel lens system", NAB 2006, Germany, Apr. 1, 2006.

Whiteman, Lou, "UPS bulks up on tech"; Oct. 26, 2005, The Deal. com, USA.

Chinese First Office Action dated Mar. 6, 2009 on on 200680004870X and English Translation of Office Action.

Chinese Second Office Action dated Oct. 30, 2009 on on 200680004870X and English Translation of Office Action.

Extended European Search Report dated Sep. 14, 2009 on EP 06760982.6.

European Official Communication under Art 94(3) EPC dated Dec. 1, 2009 on EP 06760982.6.

European (2nd) Official Communication under Art 94(3) EPC dated Jul. 9, 2010 on EP 06760982.6.

Japanese Office Action dated Jun. 21, 2011 on JP 2008-525337 and English Translation of Office Action.

New Zealand Examination Report dated Oct. 19, 2009 on NZ 566545.

Rorslett, Bjorn, "Adapting Circular Fisheyes to Nikon D1", Dec. 17, 2004, XP002542226.

"Bolex 16mm Cameras and Projectors—Price List No. P3", Dec. 1, 1980, XP002542242.

Johnson, G.E., et al, "Passive ranging through wave-front coding: information and application", Applied Optics, vol. 39, No. 11, Apr. 10, 2000, pp. 1700-1712.

Wach, Hans B., et al, "Channel Reduction and Applications to Image Processing", Applied Optics, vol. 39, No. 11, Apr. 10, 2000, pp. 1794-1798.

Dowski, E.R. Jr., "Passive ranging with an incoherent optical system", University of Colorado, Colorado. (1993).

Barton, D.L., et al, "Wavefront Coded Imaging Systems for MEMS Analysis", ISTFA 2002: Proceedings of the 28th International Symposium for Testing and Failure Analysis (ASM International), Oct. 2002, pp. 295-303.

Dowski, E.R. Jr., "Wavefront coding: jointly optimized optical and digital imaging systems", Proceedings of SPIE, The International Society for Optical Engineering, vol. 4041, Jun. 29, 2000, pp. 114-120.

Kubala, K.S., et al, "Increasing the depth of field in an LWIR system for improved object identification", Proceedings of SPIE, The International Society for Optical Engineering, vol. 5784, May 12, 2005, pp. 146-156.

Muyo, G., et al, "Decomposition of the optical transfer function: wavefront coding imaging systems", Optics Letters, vol. 30, Issue 20, 2005, pp. 2715-2717.

Dowski, E.R. Jr., "Reducing size, weight, and cost in a LWIR imaging system with wavefront coding", Proceedings of SPIE, The International Society for Optical Engineering, vol. 5407, Apr. 14, 2004, pp. 66-73.

Wach, H. et al, "Noise modeling for design and simulation of computational imaging systems", Proceedings of SPIE, The International Society for Optical Engineering, vol. 5438, Apr. 15, 2004, pp. 159-170.

Sherif, S.S. et al, "Phase Plate to Extend the Depth of Field of Incoherent Hybrid Imaging Systems", Applied Optics, vol. 43, Issue 13, May 1, 2004, pp. 2709-2721.

Dowski, E.R. Jr. et al, "Design and optimization of computational imaging systems", Proceedings of SPIE, The International Society for Optical Engineering, vol. 5299, Jan. 19, 2004, pp. 155-162.

Dowski, E.R. Jr. et al, "Modeling of wavefront-coded imaging systems", Proceedings of SPIE, The International Society for Optical Engineering, 2002, vol. 4736, pp. 116-126.

Dowski, E.R. Jr., "An Information Theory Approach to Three Incoherent Information Processing Systems", Imaging Systems Laboratory, Department of Electrical & Computer Engineering, University of Colorado, Colorado, Oct. 12, 1995.

Miceli, W., et al, "Passive Ranging with Incoherent Systems", Imaging Systems Laboratory, Optoelectronic Computing Systems Center, Department of Electrical Engineering, University of Colorado, Colorado, Oct. 12, 1995.

Cathey, W. Thomas, and Dowski, Edward R, "New paradigm for imaging systems", Applied Optics, Oct. 10, 2002, vol. 41, No. 29.

Prischipa, Inga A, and Dowski, Edward R Jr, "Wavefront coded zoom lens system", Proc. SPIE, 83 (2001).

Van Der Gracht, Joseph, "Information optimized extended depth-of-field imaging systems", Proceedings of SPIE, vol. 4388(1), SPIE, Aug. 28, 2001.

Sherif S. Sherif, Dowski, Edward R, and Cathey, W. Thomas, "Effect of detector noise in incoherent hybrid imaging systems", Optics Letters, vol. 30, Issue 19, pp. 2566-2568/2005.

Muyo, Gonzalo, and Harvey, Andrew R, "Wavefront coding for athermalization of infrared imaging systems", Proc. SPIE, vol. 2, 5612-30, (2004).

Kubala, Kenneth S, Dowski, Edward, Kobus, James, and Brown, Robert, "Design and optimization of aberration and error invariant space telescope systems", Proc. SPIE, (2004), vol. 5524, pp. 54-65.

Kubala, Kenneth, Dowski, Edward and Cathey, W, "Reducing complexity in computational imaging systems", Optics Express, (2003), pp. 2102-2108.

Barton, Daniel L., Walraven, Jeremy A, Dowski, Edward R, Dauz, Rainer, Taulstick, Andreas and Taltermeiet, Bernd, "Wavefront coded® (registered trademark) imaging systems for Mems analysis", Proc. ISTFA, (2002), pp. 295-303.

Sherif, S.S., Dowski, E.R. And Cathey, W.T., "A logarithmic phase filter to extend the depth of field of incoherent hybrid imaging systems", Proc. SPIE, vol. 4471, (2001), pp. 272-279.

Dowski, Edward R, Cormack, Robert H. And Sarama, Scott D. "Wavefront coding—jointly optimized optimal and digital imaging systems", Proc. SPIE 4041, (2000), 114.

Dowski, Edward R. and Johnson, Gregory E., "Wavefront coding: a modern method of achieving high performance and/or low cost imaging systems", Proc. SPIE 3779, (1999), 137.

Cathey, W.T, Dowski, E.R, Bradburn, Sara and Johnson, Greg, "Matched image formation/digital processing systems", Colorado University at Boulder, Elect & Comp. Eng'g, Final Rept, Apr. 1, 1995-Mar. 31, 1997, May 30, 1997, ADA 328217.

Cathey Jr, Thomas W, Dowski Jr, Edward R. and Fitzgerrell, Alan R, "Optical/digital aberration control in incoherent optical systems", Proc. SPIE 2730, (1996), 120.

Tucker, S, Cathey, WT, and Dowski Jr, E. "Extended depth of field and aberration control for inexpensive digital microscope systems", Opt. Express 1999, May 24, 4(11):467-474.

Prasad, S, Torgersen, T.C, Pauca, V.P, Plemmons, R.J, Van Der Gracht, J, "High-resolution imaging using integrated optical systems", Wiley Periodicals, Inc., (2004), vol. 14, 67-74.

Mezouari, S.H, "Hybrid Optical/Digital Codec for Mitigation of Optical Aberrations", Conf. Series—Institute of Physics, 2003, No. 177, 117-120 (ISSN 0951-3248).

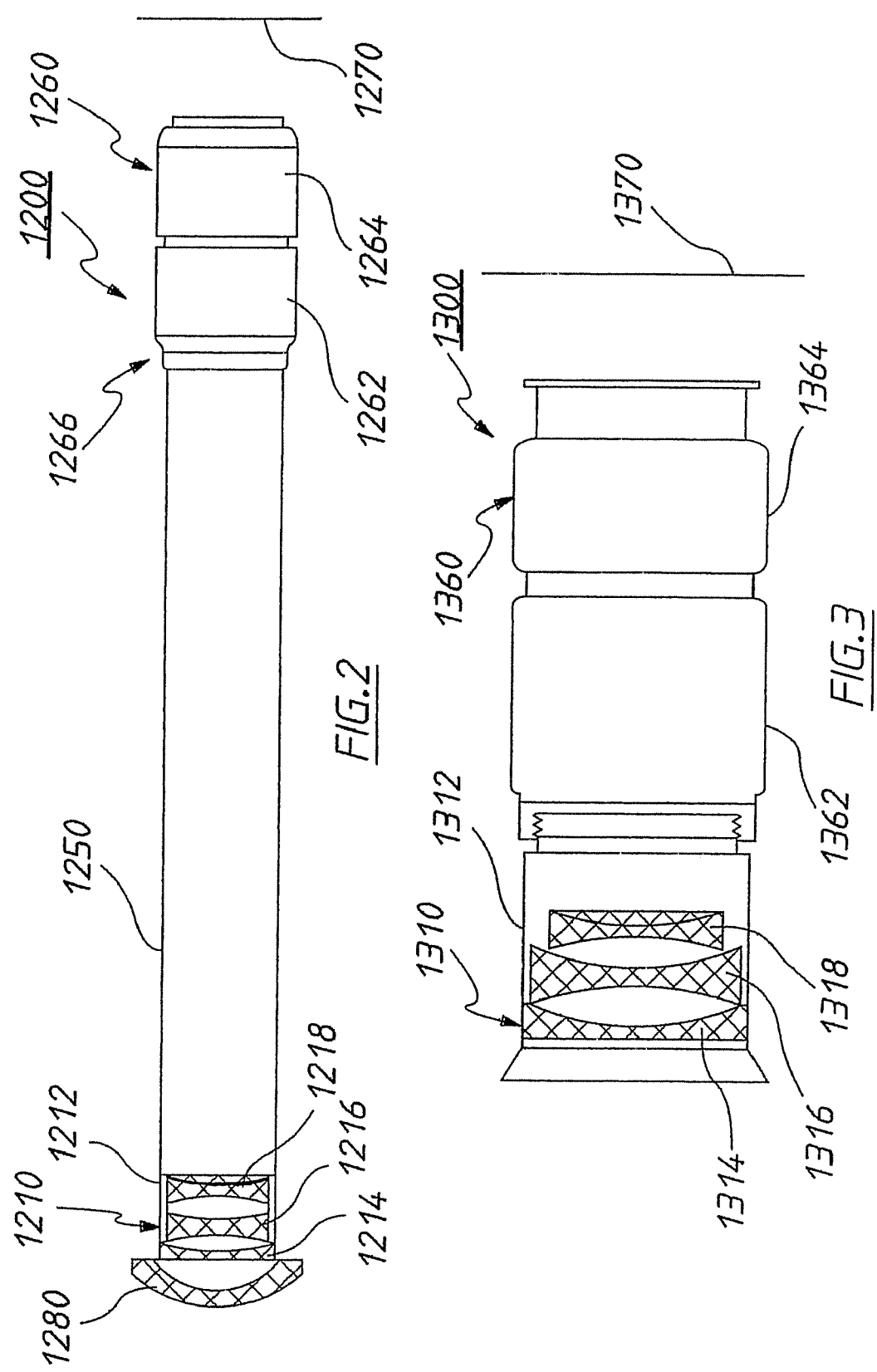

OPTICAL LENS SYSTEMS

RELATED PATENT APPLICATIONS

This patent application claims the benefit of, and is entitled to, the earlier filing dates of:
(1) Australian Provisional Patent Application No. 2005904334 filed on 11 Aug. 2005 in the name of Global Bionic Optics Pty Ltd;
(2) Australian Provisional Patent Application No. 2005905635 filed on 12 Oct. 2005 in the name of Global Bionic Optics Pty Ltd; and
(3) International (PCT) Patent Application No. PCT/AU2005/001675 filed on 3 Nov. 2005 in the names of Global Bionic Optics Pty Ltd and James Albert Frazier;
(4) Australian Provisional Patent Application No. 2006902230 filed on 28 Apr. 2006 in the name of Global Bionic Optics Pty Ltd;
(5) Australian Provisional Patent Application No. 2006903397 filed on 23 Jun. 2006 in the name of Global Bionic Optics Pty Ltd; and
(6) Australian Provisional Patent Application No. 2006904322 entitled "Double-Swivel Head Optical Lens System" and filed on 9Aug. 2006 in the name of Global Bionic Optics Pty Ltd,
each of which is incorporated herein by reference.

TECHNICAL FIELD

The present invention relates generally to an optical system for still or motion picture cameras including digital cameras, video cameras, or the like.

BACKGROUND

U.S. Pat. No. 5,727,236 that issued to Frazier on 10 Mar. 1998 describes an optical system that has the features of a wide angle lens, a deep field lens and a close focusing lens. The optical system aims to achieve a deep focus image, i.e. to make it possible to film macro subjects in focus in the foreground, while holding infinity also in focus.

The system of U.S. Pat. No. 5,727,236 comprises an objective lens, a field lens and a relay lens aligned sequentially on an optical axis and arranged in a lens cylinder or barrel.

The objective lens forms an intermediate image at or near the field lens, either in front or in back of the field lens. The objective lens may be fixed at infinity focus and have a wide open aperture for forming the intermediate image of a larger size than is otherwise normal for an objective lens of that focal length. The field lens and relay lenses transmit that same image to a smaller final image at a film plane. The relay lens is a macro lens and may have an iris and focusing mechanism, so that the objective and field lenses are not required to be used for aperture control and focusing. A Pechan prism, a roof prism, and a mirror for inverting and reversing (reverting) the intermediate image are provided in the barrel between the field and relay lenses. The Pechan prism, the roof prism, and the mirror ensure that the final image at the film plane has the normal orientation of the final image (instead of being inverted and reversed). Such an optical system requires a substantial amount of light to provide good depth of field. Also, the optical system has a substantial number of optical surfaces (i.e., air to optical media surfaces). Every time a light ray has to travel from air to glass to air again, there is some degradation of the image. There may be as many as 50 air-to-glass surfaces in such an optical system. Further the Pechan prism or its optical equivalent and the roof prism are bulky and heavy making the optical system larger and heavier than otherwise would be the case.

Snorkel-type lenses have been used for some time, but all types have necessitated alteration of the camera setup and separately attach the lens systems directly to the camera body. Snorkel lenses allow access to difficult to photograph situations, including table-top photography or ground-level access photography. The depth of field is basically the same as with normal lenses.

Disadvantageously, such lenses require removal of a zoom lens from the camera. Further this requires time to set up the camera Still further, such snorkel-type lenses require higher light levels and consequently have greater lighting costs.

Double-axis swivel optical lens systems with image rotators have been used to deal with the placement and filming of difficult situations. The image rotator corrects image orientation to correct camera geometry, even if the camera is upside down or sideways oriented. The swivel tip of the optical lens system allows low, ground level shots to be easily accessed by keeping the camera off the ground, or either underslung or overhead shots, while the camera remains in a horizontal orientation.

Disadvantageously, however, such double-axis swivel optical lens systems are expensive to produce because such systems have a large number of lens elements and prisms. Typically, such systems have up to 15 or so objective lenses for handling different angles of acceptance. Further, such optical lens systems place a zoom lens on the front of the system. The various lenses add a significant amount of weight to the front end of a camera to which the lenses are attached and extend the overall length, with the swivels being too far back. This makes the optical lens system and camera awkward to use. Therefore, such lenses are difficult to manufacture economically and are cumbersome to use. Further, a large amount of light is required to operate such lenses. Typically, the optical lens system has an F stop of F 5.6 or smaller (e.g., F 8).

SUMMARY

In accordance with an aspect of the invention, there is provided a wide-angle, deep-field, close-focusing optical system, comprising a negative lens unit for accepting radiation from an object in space, and a relay lens coupled to the negative lens unit. The negative lens unit and the relay lens are aligned on an optical axis in that order. In accordance with an aspect of the invention, there is provided a wide-angle, deep-field, close-focusing optical system, comprising: a negative lens unit for accepting radiation from an object in space; and a relay lens configured in fixed alignment with the negative lens unit, the negative lens unit and the relay lens being aligned on an optical axis in that order, the negative lens unit forming a first image on the relay lens to form a final image at a final image plane at a distance from the relay lens.

The optical system may comprise: a holding frame; two negative lens units each fixedly held in the holding frame; and two relay lens configured in fixed alignment with a respective negative lens unit.

The final image plane may be a film plane. The film plane may comprise film in a camera or a charge-coupled device ("CCD") of a digital or video camera.

The optical system may further comprise focusing and aperture controls located within the relay lens.

The optical system does not require image orientation correction optics located between the negative lens unit and the relay lens for inverting and reverting the first real image to the final image.

The optical system may further comprise a lens barrel coupled between the negative lens unit and the relay lens.

The optical system may further comprise optical axis deviation optics located between the negative lens unit and the relay lens for causing deviation of the optical axis. The optical axis deviation optics may comprise a dispersion prism or its optical equivalent. The dispersion prism may be a 60-degree dispersion prism.

The relay lens may be a macro lens. The macro relay lens may comprise a zoom lens or zoom lens components.

The optical system may further comprise an Aspheron or Aspheron-type lens coupled to the negative lens unit.

The negative lens unit may comprise a negative lens, or a negative lens cluster.

The negative lens unit may comprise a movable zoom lens component.

The negative lens cluster may comprise positive and negative lens elements, but the combination of lens elements remains negative in function. The negative lens cluster may comprise a plano-concave lens, a concave-concave lens, and a doublet lens. The optical system may further comprise a barrel housing in which the plano-concave lens, the concave-concave lens, and the doublet lens are housed.

The optical axis deviation optics may be rotatably provided on the optical axis. The optical system may further comprise a rotatable lens barrel coupled to the optical axis deviation optics and the relay lens.

The optical system may be a probe-type deep focus lens for video and/or cine cameras, the deep focus lens comprising a lens barrel coupled between the negative lens unit and the relay lens.

The optical system may be an attachment-type deep focus lens for digital and/or still cameras.

The relay lens may comprise a zoom lens or zoom lens components. The zoom lens or zoom lens components may be movable.

In accordance with another aspect of the invention, there is provided a camera, comprising a housing, an image capturing mechanism disposed within the housing, and an optical system in accordance with any of the foregoing aspects coupled to the housing.

The optical system may be coupled to the housing so that an optical axis of the optical system is perpendicular to a film plane of the image capturing mechanism.

The camera may be a still camera, a motion picture camera, a video camera, and/or a digital camera.

The image capturing mechanism may comprise analog film or a charge coupled device (CCD).

In accordance with still another aspect of the invention, there is provided an optical lens attachment. The attachment comprises: a coupling mechanism for mating engagement with at least one of a camera and an optical lens; a barrel coupled at one end to the coupling mechanism; a negative lens unit coupled to the other end of the elongated barrel; and a diopter lens disposed between the barrel and the coupling mechanism, the coupling mechanism, the diopter lens, and the barrel aligned with an optical axis.

The coupling mechanism may comprise a threaded, cylindrical member for mating interengagement with a complementary threaded, cylindrical member.

The optical lens attachment may further comprise a sealing mechanism disposed in the barrel at the end opposite that of the negative lens unit. The sealing mechanism may be an optical flat.

The attachment may be a straight, forward view barrel-lens attachment.

The optical lens attachment may further comprise an inclining prism member disposed the negative lens unit and the barrel, the negative lens unit coupled to an angled surface of the inclining prism member. The inclining prism member may comprise a mirror-surfaced dispersion prism.

Alternatively, the attachment may be an angled-view barrel-lens attachment.

The optical lens attachment may further comprise a rotation mechanism disposed between the negative lens unit and the coupling mechanism. The rotation mechanism permits 360 degree rotation of the negative lens unit about a longitudinal axis of the barrel. The rotation mechanism may comprise a rotating ring assembly coupled between the barrel and the coupling mechanism.

The coupling mechanism may matingly engage with a zoom lens of the camera.

The optical lens attachment may further comprise a macro lens unit with zoom capability coupled between the barrel and the coupling mechanism.

In accordance with an aspect of the invention, there is provided a camera, comprising: an optical lens attachment in accordance with any one of the foregoing aspects; and a zoom lens.

In accordance with another aspect of the invention, there is provided a camera, comprising: an optical lens attachment in accordance with the foregoing aspects.

In accordance with a further aspect of the invention, there is provided a double-swivel optical lens system. The system comprises a negative lens unit configured as an objective lens of the double-swivel optical lens system. The negative lens unit causes incident parallel light rays to emerge from the negative lens unit as though the light rays emanated from a focal point on the incident side of the negative lens unit. The system also comprises a mirror disposed in a housing oriented at an angle relative to an optical axis of the negative lens unit; a roof prism disposed in a housing for rotating incident light rays by 90 degrees and inverting an image; a rotation mechanism permitting rotation of the negative lens unit about a vertical axis; an image rotator comprising a prism that can invert an image, the prism disposed within the image rotator; and another rotation mechanism permitting rotation of the roof prism about an optical axis of the image rotator.

The overall function of the negative lens unit is a negative lens. The negative lens unit may comprise at least one negative lens. The negative lens unit may comprise a plurality of negative lens elements and/or negative lens clusters. The negative lens unit may comprise a plano-concave lens, a concave-concave lens and a doublet. The negative lens unit may comprise at least one lower-power positive lens.

The housing having the mirror may be coupled to the negative lens unit.

The roof prism may comprise an amici roof prism. The prism of the image rotator may comprise a Pechan prism or a dove prism. The image rotator may comprise a sleeve coupled to the prism capable of being manually rotated about the longitudinal axis of the prism to rotate an image.

The rotation mechanism permits rotation of the negative lens unit. The rotation mechanism may permit rotation of the negative lens unit and the mirror. The other rotation mechanism may be coupled between the image rotator and the roof prism.

The optical lens system may further comprise a coupling mechanism coupled for mating engagement with at least one of a zoom lens of a camera and a macro lens of a camera.

The optical lens system may further comprise a macro lens unit with zoom capability. The macro lens unit with zoom capability is focused on the negative lens unit. The macro lens unit with zoom capability may be coupled to the image rotator. The rotation mechanism may couple the image rotator and the macro relay lens. The optical lens system may further comprise a coupling mechanism coupled to the macro lens unit with zoom capability.

The lens system provides massive depth of field.

The optical lens system may further comprise a diopter lens for focusing a zoom lens of a camera on the negative lens unit.

A zoom lens of a camera comprises a diopter lens for focusing on the negative lens unit.

The mirror may be a front surfaced mirror.

The coupling mechanism may comprise a threaded, cylindrical member for mating interengagement with a complementarily threaded, cylindrical member.

The rotation mechanisms each may comprise a rotating ring assembly.

The optical lens system may further comprise a filter system. The filter system may be a drop-in filter system.

The optical lens system may be an optical lens attachment for a camera.

In accordance with still another aspect of the invention, there is provided a camera, comprising a double-swivel optical lens system in accordance with any one of the foregoing aspects.

In accordance with yet a aspect of the invention, there is provided a camera, comprising a double-swivel optical lens system in accordance with any one of the foregoing aspects, and at least one of a zoom lens and a macro lens.

BRIEF DESCRIPTION OF DRAWINGS

Embodiments of the invention are described hereinafter with reference to the drawings, in which:

FIG. 2 is a side elevation view of a wide-angle, deep-field, close-focusing optical system in accordance with another embodiment of the invention, including a partial cross-sectional view a negative lens unit;

FIG. 3 is a side elevation view of a wide-angle, deep-field, close-focusing optical system in accordance with a further embodiment of the invention, including a partial cross-sectional view a negative lens unit;

DETAILED DESCRIPTION

Figure 1:
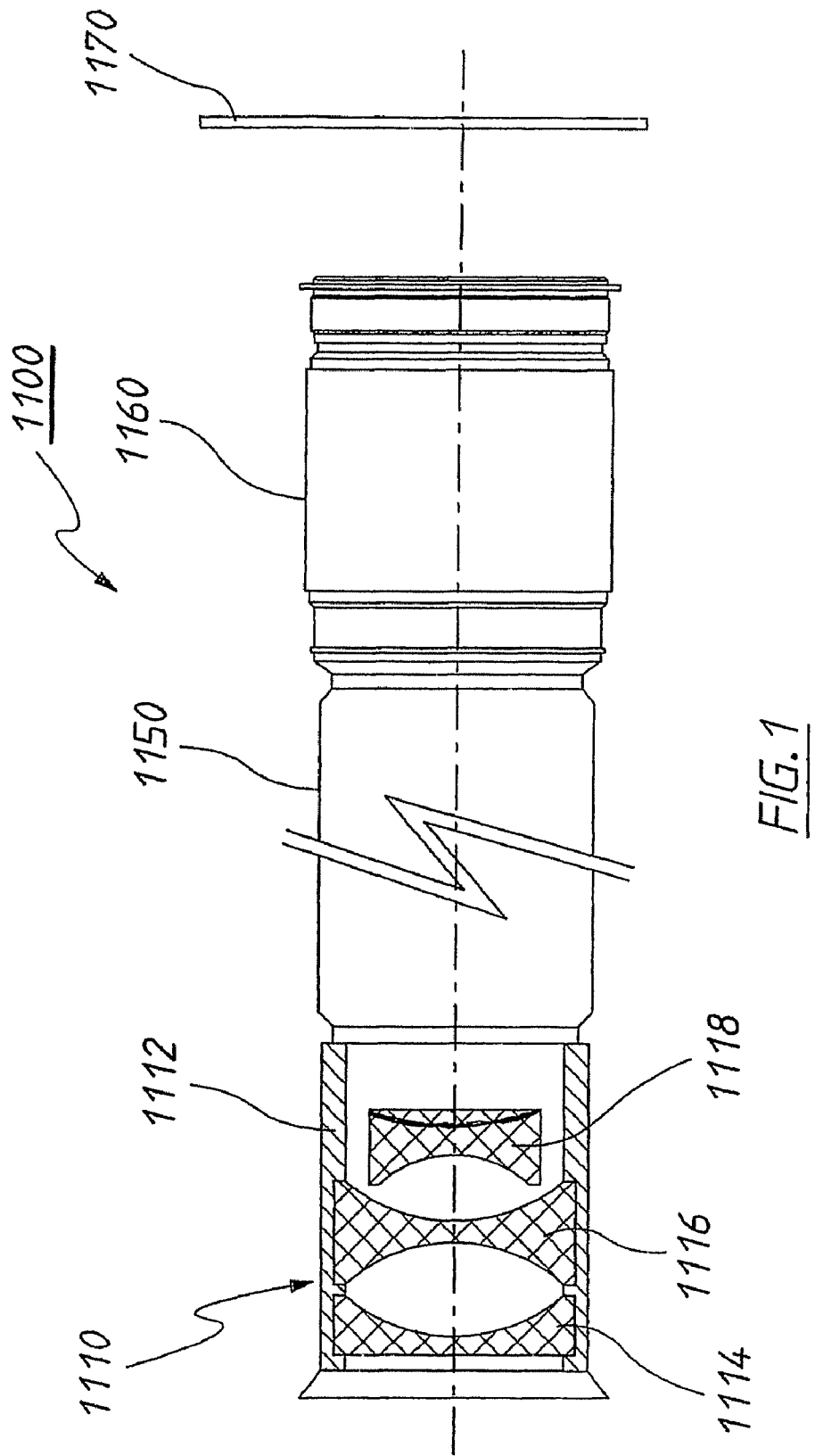
FIG. 1 is a side elevation view of a wide-angle, deep-field, close-focusing optical system in accordance with an embodiment of the invention, including a partial cross-sectional view a negative lens unit.

Wide-angle, deep-field, close-focusing optical systems are disclosed hereinafter. Optical lens attachments and cameras comprising optical lens attachments are also described hereinafter. Still further, double-swivel optical lens system and cameras comprising such double-swivel optical lens systems are described herein after. In the following description, numerous specific details, including particular film formats, lens materials, particular angled prism units, coupling mechanisms, barrel lengths, prism units, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to features, which have the same or similar reference numerals, those features have for the purposes of this description the same function(s) or operation(s), unless the contrary intention appears. Like features are given like reference numerals in the drawings (e.g. negative lens clusters 1110 and 1210 in FIGS. 1 and 2) for the sake of brevity.

In the context of this specification, the word "comprising" has an open-ended, non-exclusive meaning: "including principally, but not necessarily solely", but neither "consisting essentially or" nor "consisting only of". Variations of the word "comprising", such as "comprise" and "comprises", have corresponding meanings.

1.1 A Wide-Angle, Deep-Field Close-Focusing Optical System

FIG. 1 illustrates a wide-angle, deep-field, close-focusing optical system 1100 in accordance with an embodiment of the invention. The optical system 1100 comprises a negative lens unit 1110, an optional lens cylinder 1150 (which may be of any one of various lengths), and a relay lens 1160, which are configured in that sequence. The relay lens 1160 may be a macro lens. The optical system 1100 may be mounted on the front face of a camera (not shown). The camera may be a still or motion picture camera, a video camera, a digital camera, or the like. Behind the (macro) relay lens 1160, a film plane 1170 of the camera is positioned at a distance, so that the final image of the optical system is focused on the film plane 1170. The film plane 1170 symbolically represents the image plane for film in a camera or the charge coupled device ("CCD") of a digital or video camera. The lens barrel 1150 and the relay lens 1160 are depicted as block elements only, since numerous components of these types may be employed without departing from the scope and spirit of the invention. For example, any of a number of standard macro lenses may be used. Further the components of the system 1100 may be tailored to suit the macro lens used. Such components are well known to those skilled in the art. Further, the lens barrel 1150 is depicted using a broken line in its central region to indicate that the barrel 1150 may have any of a number of different lengths, again, without departing from the scope and spirit of the invention. Longer lenses may be preferred. Standard lengths of the lens barrel may include 1 foot (1'), 18 inches, and 2 feet (2'), for example. The length used is determined by factors including the diameter of the negative lens unit's aperture, the power of the (macro) relay lens, and the film or video format used (e.g., a smaller format leads to a longer lens). In an embodiment of the invention, an extremely long optical system can be built. Such a system may comprise a two-foot (2') long tube between a negative lens cluster or lens (acting as an objective lens) and the macro relay lens.

The negative lens unit 1110 functions as an objective lens. Negative lenses 1110 of various powers can be used, so there can be a choice of angle of acceptance. The negative lens unit 1110 may be implemented in a variety of ways, provided that the unit remains negative in function. That is, the negative lens unit causes incident parallel light rays to emerge from the negative lens unit as though the light rays emanated from a focal point on the incident side of the negative lens unit. Further, the unit 1110 may comprise both positive and negative lens elements, provided the combination remains negative in overall function. Any positive lens(es) are low power positive lens elements and the overall function of the negative lens unit remains negative.

In the embodiment shown in FIG. 1, the negative lens unit 1110 comprises a negative lens cluster. The negative lens cluster may comprise (from left to right in FIG. 1) a plano-concave lens 1114, a concave-concave lens 1116, and a doublet lens 1118. The doublet lens 1118 may comprise a concave-concave lens bonded with a plano-convex lens. In this embodiment, the negative lens unit 1110 further comprises a barrel housing 1112, which the lenses 1114, 1116, and 1118 are housed in. Both lenses 1114 and 1116 are seated in annular grooves formed in the internal surface of the barrel housing 1112 for a complementary fit.

The optical system 1100 comprises the negative lens unit 1110 as an objective lens and the relay (macro) lens 1160 only. The system 1100 does not require a field lens. The system 1160 also does not require a Pechan prism or its equivalent, a roof prism, or a mirror. The embodiment of the invention utilizes a negative lens cluster or lens, rather than a positive lens. This is contrast to existing systems that use a positive lens, which produces an image that is upside down and requires the use of a mirror and prisms to correct the orientation of the image. Alternatively, this may be done using a series of evenly spaced, positive field or relay lenses. Further, the use of a positive lens in existing systems requires the use of a field lens to magnify the image of the (positive) objective lens.

The use of the negative lens unit 1110 as the objective lens simplifies the optical system 1100, since the image focused on by the (macro) relay lens 1160 is already the correct way up. Because of the size of a negative lens image, a field lens is not required to enlarge the image. The size requirements of the objective negative lens unit 1110 are governed more by the power of the macro relay lens 1160 and the required working distance, the aperture size of the negative lens unit, the power of the macro relay lens, and the film or video format used. If a one-to-one 100 mm macro relay lens gives a working distance of one foot (1'), a one-to-one 200 mm macro relay lens gives a working distance of two feet (2'). For example, a 55 or 60 mm macro relay lens can provide good deep focus. In such an embodiment, the negative lens unit 1110 is close to the macro relay lens 1160. This can be a distinct advantage in embodiments for still photography application, for example, since the negative lens unit 1110 (i.e. acting as an objective lens) can be a simple screw on attachment. In other embodiments of the invention, the macro relay lens 1160 may comprise a zoom lens or zoom lens components.

In the embodiments of the invention, there are substantially fewer air-to-glass-to-air surfaces and therefore little or virtually nil image degradation. For example, in an embodiment of the invention, there may only be two or three such air-to-glass-to-air surfaces.

Negative lenses are less wide angle if a positive element is used in tandem. The negative lens unit 1110 may comprise a movable zoom component used in zoom lenses and works very satisfactorily as an objective lens. Negative lens clusters 1110 combine positive and negative lens elements, but remain negative in function.

1.2 Another Wide-Angle Deep-Field Close-Focusing Optical System

FIG. 2 illustrates a wide-angle, deep-field, close-focusing optical system 1200 in accordance with another embodiment of the invention. The optical system 1200 comprises a negative lens unit 1210, an optional lens cylinder 1250, and a macro relay lens 1260, again configured in that sequence. The optical system 1200 may be mounted on the front face of a camera (not shown), of the types noted hereinbefore. The negative lens unit 1210 may be implemented in a variety of ways, provided that the unit remains negative in function. That is, the negative lens unit causes incident parallel light rays to emerge from the negative lens unit as though the light rays emanated from a focal point on the incident side of the negative lens unit. The unit 1210 may comprise both positive and negative lens elements, provided the combination remains negative in overall function. Any positive lens(es) are low power positive lens elements and the overall function of the negative lens unit remains negative.

In the embodiment shown in FIG. 2, the negative lens unit 1210 comprises a negative lens cluster. The negative lens cluster may again comprise a plano-concave lens 1214, a concave-concave lens 1216, and a doublet lens 1218. The doublet lens 1218 may comprise a concave-concave lens bonded with a plano-convex lens. These components are housed in a barrel housing 1212. Behind the macro relay lens 1260, a film plane 1270 of the camera is positioned at a distance, so that the final image of the optical system is focused on the film plane 1270. The system 1200 shown in FIG. 2 is a simple "probe" type deep focus lens that may be used for video and cine cameras, including 35 mm, 16 mm, and various video formats.

The negative lens cluster 1210 may be configured the same as that shown in FIG. 1 and may be of the type used in a zoom lens to zoom an image. An optional Aspheron or Aspheron-type attachment 1280 may be used as well. The optional Aspheron or Aspheron-type attachment 1280 can correct linear distortion and can increase the wide angle. The Aspheron-type negative lenses 1280 keep the image linear without gross distortion, as well as increasing the angle of acceptance. Again, the long lens barrel 1250 and the macro relay lens 1260 are depicted as block elements only. In this embodiment of the invention, a long optical system is provided. The macro relay lens 1260 may be a 55, 60, 105 or 200 mm lens. The macro relay lens module may comprise a focus control mechanism 1262 and an aperture control mechanism 1264. In other embodiments of the invention, the macro relay lens 1260 may comprise a zoom lens or zoom lens components. Optionally, the system 1200 may have a supplementary lens 1266 coupled between the barrel 1250 and the macro relay lens 1260. The supplementary lens 1266 permits a shorter lens barrel to be used. The supplementary lens 1266 can be useful because it cause the macro lens to lose less light than might otherwise be the case.

1.3 Yet Another Wide-Angle Deep-Field, Close-Focusing Optical System

FIG. 3 illustrates a wide-angle, deep-field, close-focusing optical system 1300 in accordance with still another embodiment of the invention. The optical system 1300 comprises a negative lens unit 1310 and a macro relay lens 1360 configured in that sequence. The negative lens unit 1310 may be implemented in a variety of ways, provided that the unit remains negative in function. That is, the negative lens unit causes incident parallel light rays to emerge from the negative lens unit as though the light rays emanated from a focal point on the incident side of the negative lens unit. The unit 1310 may comprise both positive and negative lens elements, provided the combination remains negative in overall function. Any positive lens(es) are low power positive lens elements and the overall function of the negative lens unit remains negative.

In the embodiment shown in FIG. 3, the negative lens unit 1310 comprises a negative lens cluster. The negative lens cluster may comprise a plano-concave lens 1314, a concave-concave lens 1316, and a doublet lens 1318. The doublet lens 1318 may comprise a concave-concave lens bonded with a plano-convex lens. These components are housed in a barrel housing 1312. The optical system 1300 may be mounted on the front face of a camera (not shown), of the types noted hereinbefore, e.g. a still camera. Behind the macro relay lens 1360, a film plane 1370 of the camera is positioned at a distance, so that the final image of the optical system is focused on the film plane 1370. The system 1300 shown in FIG. 3 may be implemented as an attachment-type deep focus lens for digital and still cameras (e.g. 35 mm).

The negative lens cluster 1310 may be configured the same as that shown in FIG. 1 and may be of the type used in a zoom lens to zoom an image. The negative lens unit 1310 is directly coupled to the macro relay lens (e.g. 55 mm or 60 mm) using a mated, screw-in assembly. In this embodiment, the negative lens unit 1310 has a male screw-in member and the macro relay lens 1360 has a corresponding female screw-in receptacle connected to the focus control 1362. The focus control 1362 and aperture control 1364 are as provided in the macro relay lens. In other embodiments of the invention, the macro relay lens 1360 may comprise a zoom lens or zoom lens components.

1.4 Still Another Wide-Angle Deep-Field Close-Focusing Optical System

Figure 4:
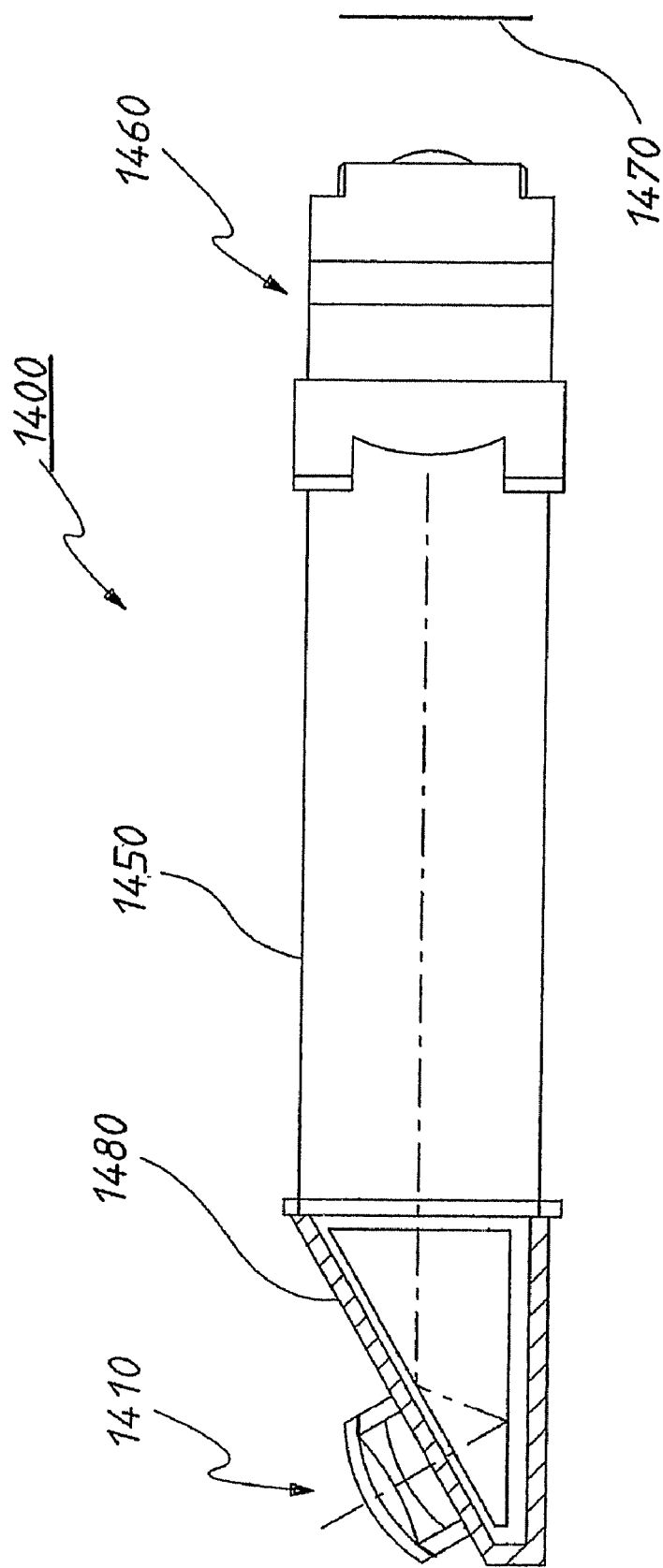
FIG. 4 is a side elevation view of a wide-angle, deep-field, close-focusing optical system in accordance with still a further embodiment of the invention.

FIG. 4 illustrates a wide-angle, deep-field, close-focusing optical system 1400 in accordance with a further embodiment of the invention. The optical system 1400 comprises a negative lens unit 1410, a dispersion prism 1480, a lens barrel 1450, and a macro relay lens 1460 configured in that sequence. The negative lens unit 1410 may be implemented in a variety of ways, provided that the unit remains negative in function. That is, the negative lens unit causes incident parallel light rays to emerge from the negative lens unit as though the light rays emanated from a focal point on the incident side of the negative lens unit. The unit 1410 may comprise both positive and negative lens elements, provided the combination remains negative in overall function. Any positive lens(es) are low power positive lens elements and the overall function of the negative lens unit remains negative. In this embodiment, as shown in FIG. 4, the negative lens unit 1410 comprises a single negative lens. Alternatively, the negative lens unit may comprise a negative lens cluster as shown in any of FIGS. 1 to 3.

In this embodiment, a 60-degree dispersion prism may be practiced. Further, the lens barrel 1450 is rotatably coupled to the macro relay lens 1460, behind which is disposed the film plane 1470. The macro relay lens 1460 comprises aperture and focus control mechanisms (not depicted separately as in FIGS. 2 and 3). In other embodiments of the invention, the macro relay lens 1460 may comprise a zoom lens or zoom lens components. As shown in FIG. 4, the negative lens unit 1410 is connected to an inclined surface of the prism 1480, so that the unit 1410 is aligned off-axis relative to the central longitudinal axis of the lens barrel 1450. This deviation aspect allows the lens barrel 1450 to be rotated to give the correct camera geometry in certain difficult positions, e.g. from a floor position. Thus, for example, the camera can be sat on the ground to capture images at difficult angles. This allows easy access to difficult perspectives. Rotation of the lens barrel enhances this aspect, permitting easy overhead and under-slung shots, for example.

1.5 Yet Another Wide-Angle, Deep-Field, Close-Focusing Optical System

Figure 5:
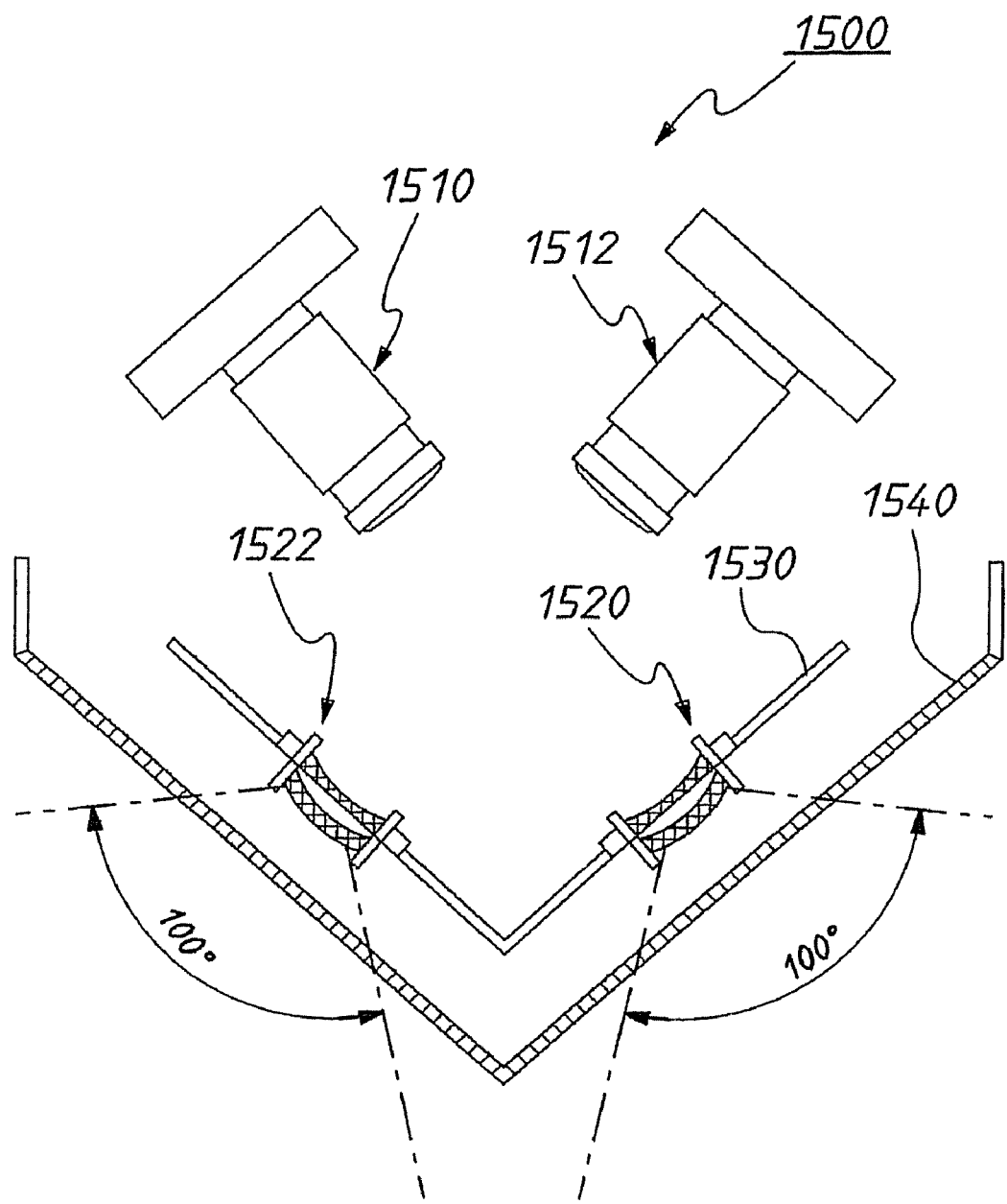
FIG. 5 is a side elevation view of a dual, wide-angle, deep-field, close-focusing optical system in accordance with yet another embodiment of the invention.

FIG. 5 illustrates a dual wide-angle, deep-field, close-focusing optical system 1500 in accordance with a further embodiment of the invention. The dual lens setup 1500 is adapted for use in a fixed size compartment or camera port in an aircraft fuselage (not shown). Two macro relay lenses 1510, 1510, 512 are fixed in position, each one facing and optically aligned with a respective negative lens unit 1520, 1520, 1522. For example, the macro relay lenses 1510, 1510, 1512 may be F 2.8 Micro-Nikkon macro relay lenses, providing a F 2.8 capability, which may provide a daytime shutter priority camera setting and a nighttime aperture priority. For example, the negative lens units may be 55 mm negative lens clusters. The macro relay lenses and negative lens units function and may be constructed in the manner hereinbefore described.

The negative lens units 1520, 1520, 1522 are each fixed in position relative to the respective macro relay lens 1510, 1510,1 512 by a holding frame 1530, which may be made of metal. In this manner, lens barrels are not required. A glass panel 1540 suspended beneath the holding frame 1530 encloses the dual lens setup 1500 within the aircraft fuselage. In this embodiment, each macro relay lens and negative lens unit combination 1510, 1510, 1512 and 1520, 1520, 1522 provides a 100 degree angle of view. The angles of view overlap.

With the embodiment of the invention, two 35 mm cameras may be used in place of a 70 mm camera for example. The negative lens units and macro relay lenses may be held on axis in a pin-registered, locating frame. While two negative lens unit and macro relay lens combinations are shown in this embodiment, it will be appreciated by those skilled in the art in the light of this disclosure that other numbers may be practiced including a single negative lens unit and macro relay lens combination. In other embodiments of the invention, the macro relay lenses 1510, 1512 may each comprise a zoom lens or zoom lens components. In the embodiments depicted in FIGS. 1 to 5, the macro relay lens may comprise a movable zoom lens or movable zoom lens components.

The foregoing embodiments of the invention involved less degradation of an image due to fewer components and hence less air-to-glass-to-air degradation. Also the negative lens cluster as objective lens inverts the resulting image to the correct orientation, which permits the embodiments of the invention to do away with mirrors and prisms required by existing systems. In the embodiments of the inventions, different lens lengths can be used, making the lens suitable for different cameras and film formats.

2.0 Overview of Barrel-Lens Attachment.

The embodiments of the invention described hereinafter are able to provide massive depth of field. That is the embodiments of the invention provide a wide-angle, deep-field, close-focusing optical system. Some embodiments of the invention negate the need to remove a zoom lens from the camera, by attaching the optical lens attachment to the zoom lens, thereby saving time setting up the camera. Further the embodiments of the invention increase the depth of field, which is useful for table-top macro photography. Still further, the embodiments of the invention are above to do so at greatly reduced light levels, thereby reducing the amount of light required, and thus saving on the cost of lighting.

The partial use of the "telephoto" end of the zoom lens can still be used to alter the field size and angle of acceptance of the subject matter. Partial zoom can be performed and achieved during the shot.

Two forms of optical lens attachment are described hereinafter, namely a straight, forward view unit and an inclined angle (e.g., 60 degrees) view unit. Because of rotation about a main axis, the inclined angle view unit can access difficult lens placement situations. Controls such as focus, aperture and zoom can be carried out on the dedicated lens supplied with the camera.

2.1 A Straight, Forward-View Barrel-Lens Attachment.

Figure 6:
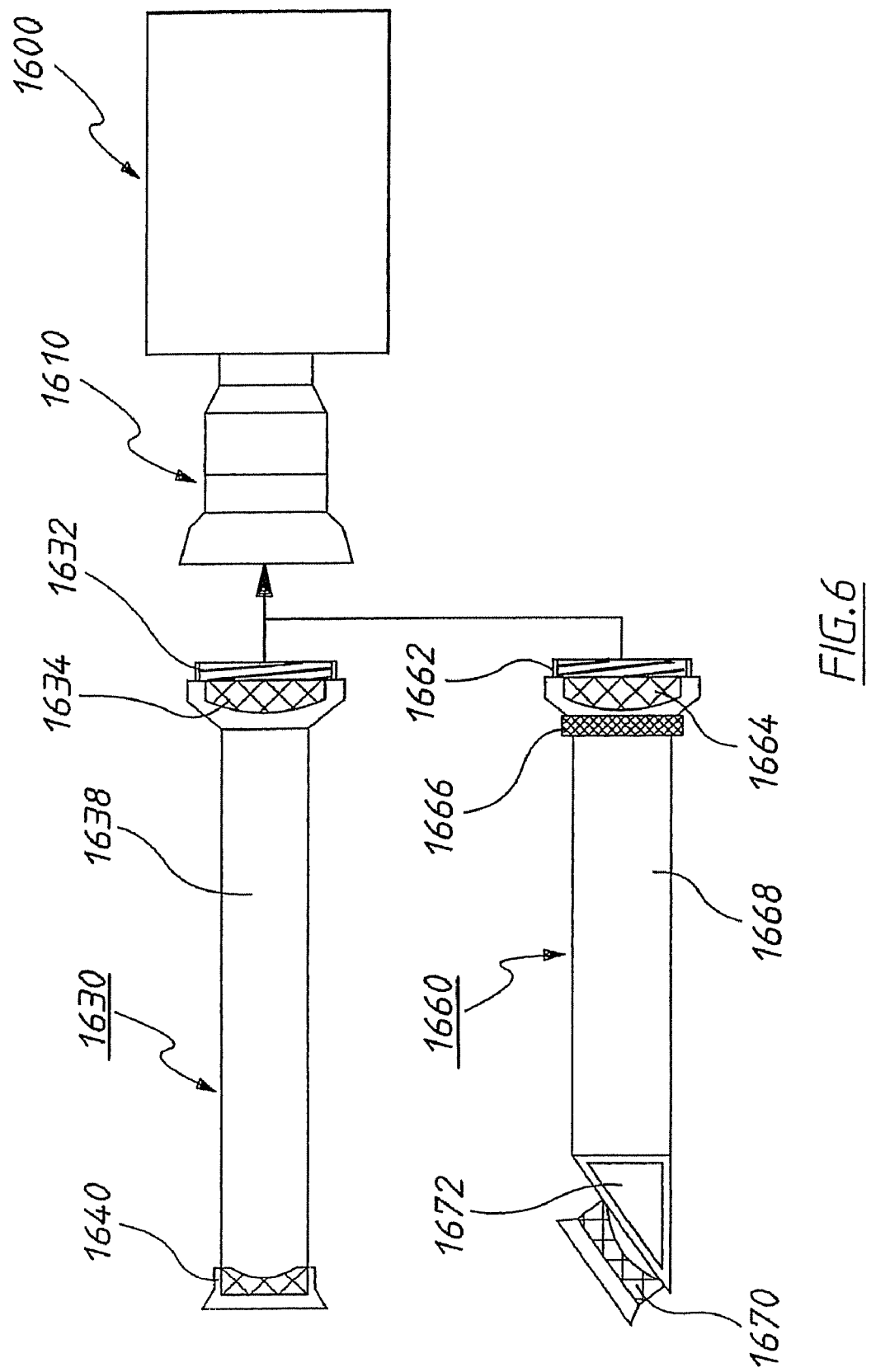
FIG. 6 is a side elevation view of two optical lens attachments in accordance with embodiments of the invention suitable for use with a video or film camera.

FIG. 6 is block diagram illustrating two optical lens attachments 1630, 1660 for use with a camera 1600, e.g. a video camera or film camera. The camera 1600 has a zoom lens 1610 aligned with its optical axis. Examples of such cameras include Sony, JVC, Canon video cameras with zoom lenses, or 16 mm or 35 mm cine film cameras with zoom lenses.

One of the optical lens attachments 1630 is a straightforward view lens attachment in accordance with an embodiment of the invention. This attachment 1630 comprises a coupling mechanism 1632 for mating engagement with the zoom lens 1610 of the camera 1600. As depicted in FIG. 16, the coupling mechanism 1632 itself comprises an externally threaded, cylindrical male member for mating interengagement with an internally threaded, cylindrical female member (not shown) of the camera's zoom lens 1610. Other coupling mechanisms may be used without departing from the scope and spirit of the invention. For example, a bayonet-type clip arrangement may be substituted for the threaded male/female coupling mechanism 1632 of FIG. 6, with corresponding adaptation of the zoom lens hood.

A lens cylinder or barrel (simply "barrel" hereinafter) 1638 is coupled at one end to the coupling mechanism 1632. For example, the barrel 1638 may have a length between 12 and 18 inches, but other barrel lengths may be practiced without departing from the scope and spirit of the invention. As shown in FIG. 6, the barrel 1638 is an elongated, cylindrical member and has a smaller diameter than that of the coupling mechanism 1632 for engagement with the zoom lens 1610. Thus, a conical frustum section with a cylindrical skirt may connect the elongated barrel 1638 to the coupling mechanism 1632. Obviously, if the coupling mechanism 1632 and the barrel 1638 are the same or substantially the same diameter, the conical frustum section and skirt may be omitted. For the purposes of discussion, the conical frustum section and skirt are considered as part of the coupling mechanism hereinafter, since the employment of these parts is dependent upon the requirements for the coupling mechanism 1632.

A supplementary lens, which is a close-up lens or diopter 1634 (simply "diopter" or "diopter lens" hereinafter), is disposed between the barrel 1638 and the coupling mechanism 1632 in this embodiment. The diopter 1634 focuses the zoom lens on a negative lens unit 1640, described hereinafter. As the diopter 1634 is of larger diameter than the barrel 1638 but small diameter than the coupling mechanism 1632, the diopter 1634 is housed in the conical frustum section and skirt in this embodiment. However, variations to the location and housing of the diopter 1634 may be practiced without departing from the scope and spirit of the invention.

The negative lens unit 1640 is coupled to the other end of the elongated barrel 1638. Any of a number of negative lens elements and/or negative lens clusters well known to those skilled in the art may be implemented without departing from the scope and spirit of the invention. Optionally, the attachment 1630 may also have a lens hood (as shown in FIG. 16) to protect the negative lens unit 1640 at that end of the barrel 1638. The coupling mechanism 1632, the diopter 1634, the elongated barrel 1638, and the negative lens unit 1640 are all concentrically aligned with the optical axis of the camera 1610. Thus, the optical lens attachment 1630 according to this embodiment forms a straight, forward-view barrel-lens attachment.

The negative lens unit 1640 causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

2.2 An Angled-View Barrel-Lens Attachment.

The other optical lens attachment 1660 of FIG. 6 is an angled-view lens attachment in accordance with a further embodiment of the invention. This attachment 1660 also comprises a coupling mechanism 1662 for mating engagement with the zoom lens 1610 of the camera 1600. This coupling mechanism 1662 can be of the same structure and configuration as that of coupling mechanism 1632, and suitable variations and substitutions may be made thereto as described with reference to the coupling mechanism 1632.

A barrel 1668 can be coupled at one end directly (not shown) to the coupling mechanism 1662. Again, for example, the barrel 1668 may have a length between 12 and 18 inches, but other barrel lengths may be practiced without departing from the scope and spirit of the invention. However, the barrel 1668 may be coupled to the coupling mechanism 1662 by a rotation mechanism 1666, which allows the barrel 1668 to be rotated 360 degrees as described in greater detail hereinafter. The rotation mechanism 1666 may comprise a rotating ring assembly permitting 360 degree rotation of the elongated barrel. Again, as shown in FIG. 6, the barrel 1668 has a smaller diameter than that of the coupling mechanism 162 for engagement with the zoom lens 1610. Thus, a conical frustrum section with a cylindrical skirt may connect the elongated barrel 1668 or the rotation mechanism 1666 to the coupling mechanism 1662. A diopter 1664 is disposed between the barrel 1668 and the coupling mechanism 1662 in this embodiment. The diopter 1664 focuses the zoom lens on a negative lens unit 1640, described hereinafter.

An inclining prism member 1672 is coupled to the other end of the elongated barrel 1668. In the embodiment shown in FIG. 6, this prism member 1672 is a 60 degree inclining prism, but other angled prisms may be practiced without departing from the scope and spirit of the invention. A negative lens unit 1670 is located on the inclined surface of the prism 1672 relative to the longitudinal axis of the barrel 1668. Again, any of a number of negative lens elements and/or negative lens clusters well known to those skilled in the art may be implemented without departing from the scope and spirit of the invention. Also, the attachment 1660 may also have a lens hood (as shown in FIG. 6) to protect the negative lens unit 1670 at that end of the barrel 1668. The rotation mechanism 1666 allows inclining prism 1672 and hence the negative lens unit 1670 to be rotated by up to 360 degrees. Thus, the optical lens attachment 1630 according to this embodiment forms an angled-view barrel-lens attachment.

The negative lens unit causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

2.3 Another Angled-View Barrel-Lens Attachment.

Figure 7:
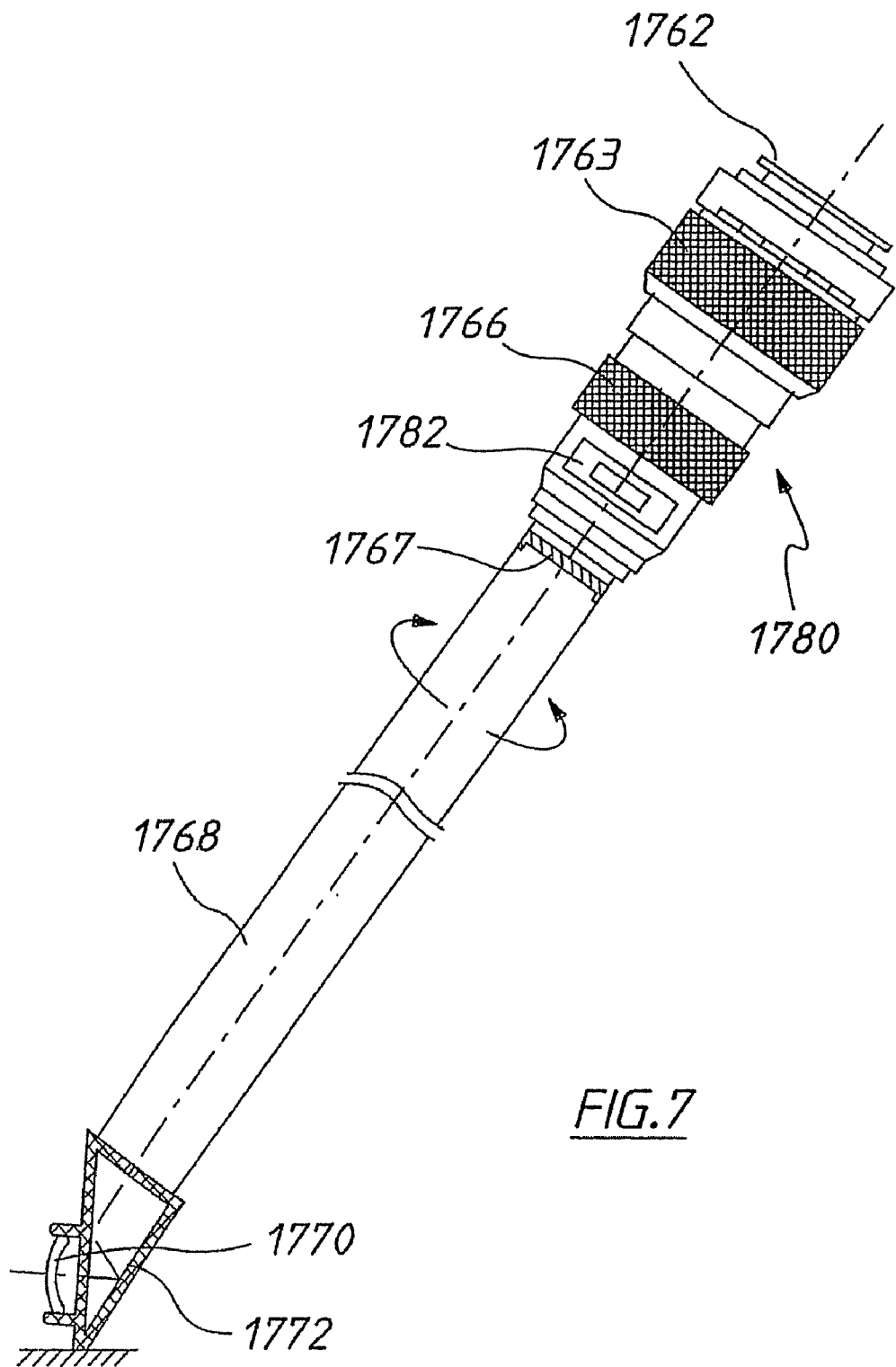
FIG. 7 is a side elevation view of an optical lens attachment in accordance with yet another embodiment of the invention suitable for use with a video or film camera.

Still another optical lens attachment 1760 is shown in FIG. 7 comprising an angled-view lens attachment in accordance with a further embodiment of the invention. This attachment C360 comprises a coupling mechanism 1762 for mating engagement with a camera (not shown). This coupling mechanism 1762 can be of the same structure and configuration as that of coupling mechanism 1632, and suitable variations and substitutions may be made thereto as described with reference to the coupling mechanism 1632. Various couplings as with the other embodiments may be used to suit different cameras.

A barrel 1768 can be coupled at one end directly (not shown) to a macro lens unit with zoom capability 1780, which for example may be a F2.8 100 mm macro lens. In turn, the macro lens unit with zoom capability 1780 is connected to the coupling mechanism 1762. However, the barrel 1768 may be coupled to the macro lens unit 1780 by a suitable rotation mechanism, which allows the barrel 1768 to be rotated 360 degrees. The macro lens unit with zoom capability 1780 is not a zoom lens with a macro mode. In this embodiment, the macro lens unit with zoom capability 1780 focuses on the negative lens unit 1770. This embodiment has a dedicated macro lens unit.

As shown in FIG. 7, a drop-in filter 1782 can disposed between the barrel 1768 and the macro lens unit with zoom capability 1780 in this embodiment. This may an externally rotatable one-stop polarizer. The macro lens unit 1780 may comprise a focus ring 1766 and a manual zoom control ring 1763, which can have the option to couple to the camera's own zoom control switch. The barrel 1768 may comprise an optical flat as a sealing mechanism 1767 to seal the barrel 1768. Also, the barrel 1768 may be adapted for quickfit attachment to the macro lens unit 1780. Various barrel lengths may be practiced to suit different formats. For example, there may be one unit for 35 mm film, and another one for other formats. In one embodiment the barrel 1768 and an inclining prism 1772 may be approximately 300 mm in length and waterproof so as to be submersible.

The inclining dispersion prism 1772 is coupled to the other end of the elongated barrel 1768. In this embodiment, the prism member 1772 is a 60 degree inclining prism, but other angled prisms may be practiced without departing from the scope and spirit of the invention. A negative lens unit 1770 is located on the inclined surface of the prism 1772 relative to the longitudinal axis of the barrel 1768. The barrel 1768 and hence the inclining prism 1772 and the negative lens unit 1770 can be rotated by 360 degrees. The negative lens unit 1770 may be an aspheric negative lens. While the embodiment of FIG. 7 has been described as an inclined angle view unit, it will be appreciated by those skilled in the art that another embodiment can be practiced using a straight, forward view unit like that of FIG. 6.

The negative lens unit causes incident parallel light rays to emerge from the negative lens unit as though the light rays emanated from a focal point on the incident side of the negative lens unit. The unit may comprise both positive and negative lens elements, provided the combination remains negative in overall function. Any positive lens(es) are low power positive lens elements and the overall function of the negative lens unit remains negative.

Still further, cameras may be practiced in accordance with embodiments of the invention which comprise an optical lens attachment as described hereinbefore with a zoom lens of the camera, or an optical lens attachment having a macro lens unit with zoom capability. Examples of such video or film cameras are well known to those skilled in the art.

3.0 Overview of Double-Swivel Optical Lens Systems

The following embodiments of the invention are able to provide massive depth of field, which renders both foreground and background subjects in focus. This is useful for table-top macro photography.

Still further, the following embodiments of the invention are able to do so at greatly reduced light levels, thereby reducing the amount of light required, and thus saving on the cost of lighting.

Some embodiments of the invention negate the need to remove a zoom lens or macro lens from a camera, by attaching the double-swivel optical lens attachment to the zoom lens or macro lens, thereby saving time setting up the camera. Some embodiments of the invention simply attach to an existing zoom lens or macro lens of a camera, which enables the elimination of additional optics and their associated costs. The partial use of the "telephoto" end of a zoom lens can still be used to alter the field size and angle of acceptance of the subject matter. Partial zoom can be performed and achieved during the shot.

3.1 Double-Swivel Optical Lens Attachment

Figure 8:
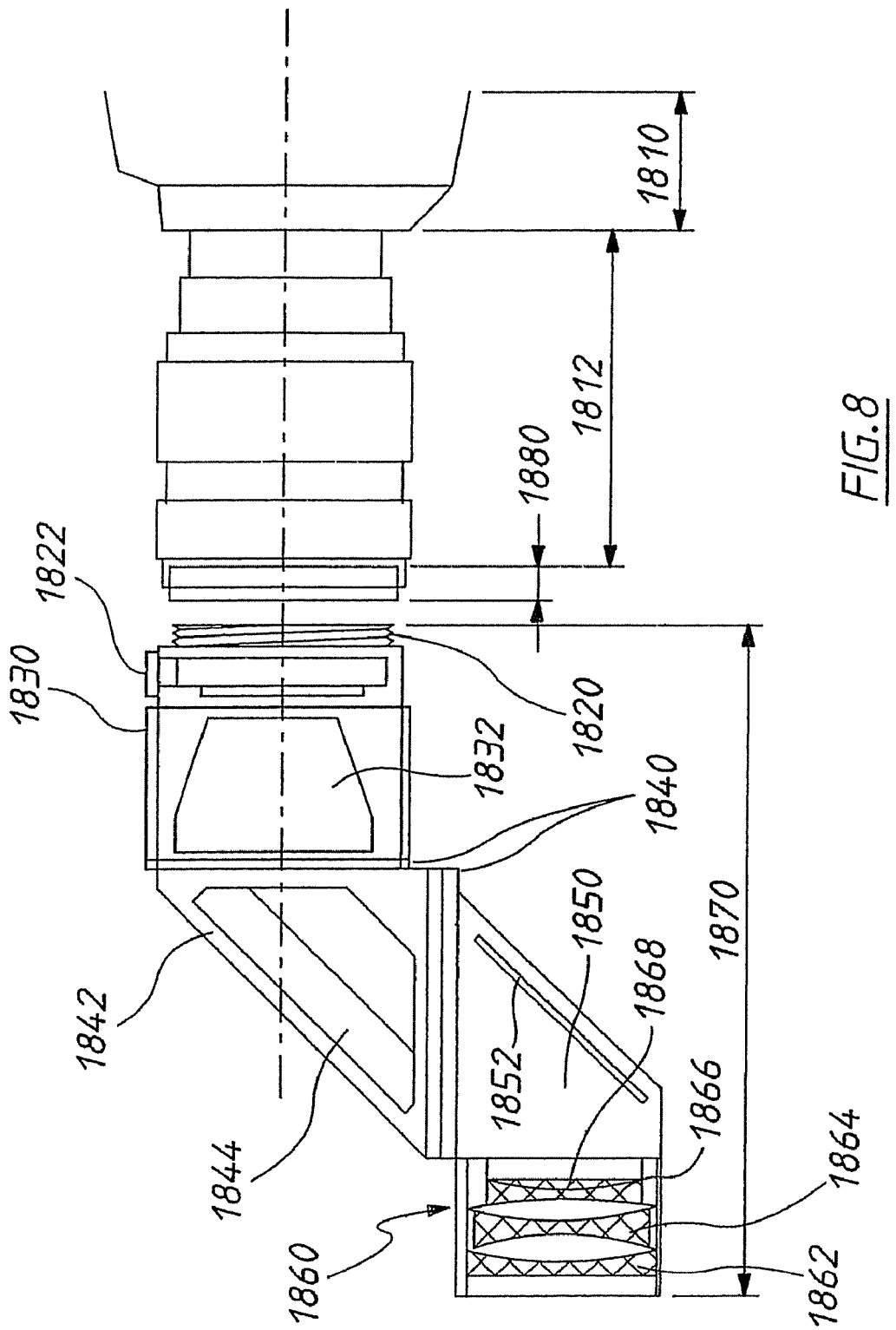
FIG. 8 is a side elevation view of a double-swivel optical lens system in accordance with an embodiment of the invention suitable for use with a video or film camera.

FIG. 8 illustrates an arrangement of 1800 of a double-swivel optical lens system 1870 in accordance with an embodiment of the invention. The attachment 1870 can be used with a camera 1810, e.g. a video camera or a film camera. This system 1870 is practiced as a double-swivel optical lens for a camera 1810 that has a zoom lens or macro lens 1812 attached to the camera 1810, which is aligned with the camera's optical axis. Examples of such cameras include Sony, JVC, Canon video cameras with zoom lenses, or 16 mm or 35 mm cine film cameras with zoom lenses. These are just examples of cameras with which this and other embodiments of the invention may be practiced.

The attachment 1870 comprises a coupling mechanism 1820 for mating engagement with the existing zoom lens or macro lens 1812 of the camera 1810. As shown in FIG. 8, the coupling mechanism 1820 in this embodiment is an externally threaded, male cylindrical member for engagement with an internally threaded, female cylindrical member (not shown) of the zoom lens or macro lens 1812. However, other coupling mechanisms well known to those skilled in the art may be practiced without departing from the scope and spirit of the invention. For example, a bayonet-type clip arrangement may be substituted for the threaded male/female coupling mechanism 1820 of FIG. 8, with corresponding adaptation of the zoom lens or macro lens 1812 of the camera 1810.

The system comprises an existing zoom lens with a close-up, diopter supplementary lens 1880 or a macro lens 1812. The diopter lens 1880 may be mounted in the zoom lens, or coupled to the zoom lens 1812. Other configurations may be implemented provided the diopter lens 1880 is positioned to focus the existing zoom lens 1812 on a negative lens unit 1860, discussed hereinafter. The diopter 1880 focuses the zoom lens 1812 on the virtual image of the negative lens unit 1860. Otherwise, the macro lens 1812 is focused on the negative lens unit. The zoom lens or the macro lens 1812 is a relay lens in the system 1870.

A cylindrical housing 1834 is coupled to the coupling mechanism 1820. Optionally, the cylindrical housing 1834 is adapted at the end adjacent to the coupling mechanism 1820 to receive a drop-in filter system 1822, which is preferably input from the top surface of the housing 1834 as shown in FIG. 8. The cylindrical housing also forms part of an image rotator 1830. Preferably, the image rotator 1830 comprises a Pechan prism 1832 disposed within the image rotator 1830. The Pechan prism 1832 is an optical lens element capable of rotating an image. The image rotator 1830 has rotatable external sleeve coupled to the Pechan prism that can be manually rotated about its longitudinal axis to rotate the image using the Pechan prism 1832. In an alternative embodiment, a dove prism (well known to those skilled in the art) may be practiced instead of a Pechan prism in the image rotator 1830. A dove prism is a reflective prism shaped from a truncated right-angle prism that can invert an image.

The double-swivel attachment 1870 further comprises two rotation mechanisms 1840, which are preferably rotation rings. One rotation ring 1840 couples the image rotator 1830 to an angled (in side elevation) housing 1842, which may be triangular or largely triangular in form. The angled housing 1842 has an amici roof prism 1844 disposed within the housing 1842, The prism 1844 can deviate light by 90° through the angled housing 1842 and invert an image simultaneously. Thus, the longitudinal optical axis through the image rotator 1830 and the zoom lens (with diopter) or the macro lens 1812, which is horizontal in the drawing, is rotated 90° by the amici roof prism 1844, so that the optical axis is oriented in a vertically downward manner in the drawing.

As shown in FIG. 8, another angled housing 1850 is coupled to the angled housing 1842 via the second rotation ring 1840. In the angled surface 1854 of the angled housing 1850, a front surfaced mirror is 1852 is mounted. The angled housing 1854 is coupled at the surface opposite the mirror 1852 to the negative lens unit 1860. The negative lens unit 1860 functions as an objective lens and is a sealed unit. Any of a number of negative lens elements and/or negative lens clusters well known to those skilled in the art may be implemented in the negative lens unit 1860 without departing from the scope and spirit of the invention. The overall function of the negative lens unit is a negative lens. That is, the negative lens unit causes incident parallel light rays to emerge from the negative lens unit as though the light rays emanated from a focal point on the incident side of the negative lens unit. Some elements of the negative lens unit may be positive lens(es), provided they are low power positive lens elements and the overall function of the negative lens unit 1860 remains negative.

Negative lens elements of various powers can be used in the negative lens unit 1860, so there can be a choice of angles of acceptance. The negative lens unit 1860 may be implemented in a variety of ways, provided that the unit remains negative in function. In the embodiment shown in FIG. 8, the negative lens unit 1860 comprises a negative lens cluster. In FIG. 8, the negative lens unit 1860 comprises (from left to right) a plano-concave lens 1862, a concave-concave lens 1864, and a doublet lens 1866, 1868. The doublet lens 1866, 1868 may comprise a concave-concave lens 1866 bonded with a plano-convex lens 1868. The negative lens unit 1860 may be an aspheric negative lens.

The rotation ring 1840 between the angled housing 1842 and the image rotator 1830 permits the negative lens unit 1860, the angled housing 1854, and the angled housing 1842 to be rotated about the longitudinal axis extending through the image rotator 1830, which is oriented in a horizontal manner in FIG. 8. The other rotation ring 1840 between the angled housing 1842 and the angled housing 1854 permits the angled housing 1854 and the negative lens unit 1860 to be rotated about a vertical axis.

The light rays "emanating" from the focal point on the incident side of the negative lens unit 1860 is reflected 90° (from horizontal to vertical) to the amici roof prism 1844. The prism 1844 rotates the light rays by 90° and inverts the image. The Pechan prism 1832 can be used to rotate the image so that the image is a normal (non-inverted) orientation as is the case at the negative lens unit 1860. In this manner, a correctly oriented image can always be dialed up by adjusting the image rotator 1830. The diopter 1880 focuses the zoom lens 1812 on the image on the incident side of the negative lens unit 1860. The diopter 1880 is not required for focusing the macro lens 1812 on the negative lens unit.

In the foregoing embodiment of the invention, the zoom lens (with diopter) or macro lens 1812 is located behind the attachment 1870, and therefore does not add to the weight on the front end of the attachment 1870. Further the zoom lens 1812 is able adjust the field of view, instead of requiring many expensive objective lenses on the front end of the system 1870. Advantageously, the attachment 1870 remains compact and is much lighter.

3.2 Another Double-Swivel Optical Lens System

Figure 9:
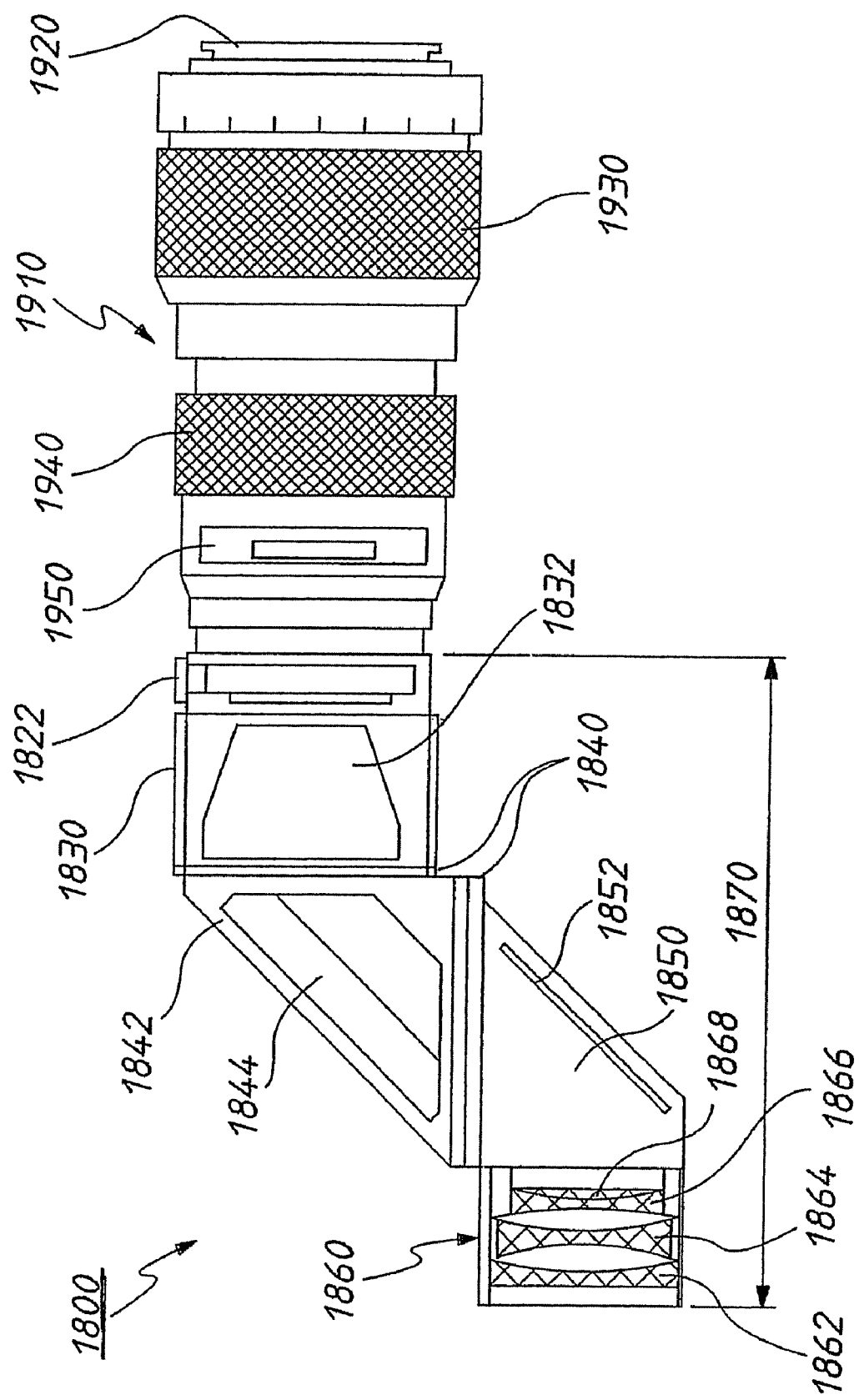
FIG. 9 is a side elevation view of a double-swivel optical lens system in accordance with another embodiment of the invention suitable for use with a video or film camera.

FIG. 9 illustrates a double-swivel optical lens system 1900 in accordance with another embodiment of the invention. Again, the attachment 1900 can be used with a camera (not shown), e.g. a video camera or a film camera. With regard to FIG. 9, features that have the same reference numerals as those in FIG. 8 are the same features and have the same function(s) or operation(s), unless the contrary intention appears. The description of such features and their configuration are not repeated in the description of FIG. 9 for the sake of brevity only. Also, corresponding modifications and/or substitution of features may be made as described with reference to FIG. 8. The attachment 1900 comprises a negative lens unit 1860, an angled housing 1850 and a mirror 1852, two rotation mechanisms 1840, another angled housing 1842 and a roof prism 1844, and image rotator 1830 and a Pechan or dove prism 1832. The attachment 1900 optionally may have the drop-in filter 1822 as in FIG. 18, or this feature may be omitted. The coupling mechanism 1820 of FIG. 8 is omitted.

The attachment 1900 further comprises a macro lens unit with zoom capability 1910, which for example may be a F2.8 100 mm macro lens. In turn, the macro lens unit with zoom capability 1910 is connected to a coupling mechanism 1920. The macro lens unit 1910 may be coupled to the image rotator 1830 by a suitable rotation mechanism, in which case the rotation mechanism 1840 between the image rotator 1830 and the angled housing 1842 may be omitted. The macro lens unit with zoom capability 1910 is not a zoom lens with a macro mode. In this embodiment, the macro lens unit with zoom capability 1910 focuses on the negative lens unit 1860. This embodiment has a dedicated macro lens unit.

A drop-in filter 1950 can disposed between the image rotator 1830 and the macro lens unit with zoom capability 1910 in this embodiment. This may an externally rotatable one-stop polarizer. The macro lens unit 1910 may comprise a focus ring 1940 and a manual zoom control ring 1930, which can have the option to couple to the camera's own zoom control switch.

The embodiments of the present invention provide a double-swivel optical lens system that can be simply attached to existing zoom lenses (with diopter) or macro lenses of a camera, thereby eliminating the costs of additional optical elements. The negative lens unit is much simpler with a greatly reduced number of lens elements. Furthermore, the amount of light needed for this system is greatly reduced. For example, an F stop of F2.8 or F 4 may be achieved dependent upon the available maximum aperture of the zoom lens. All controls, such as aperture, focus and zoom, can be carried out on the zoom lens or macro lens of the camera. The double-swivel tip optical lens system allows greater versatility for an otherwise cumbersome camera and lens unit. The axes of swivel and the image rotator may be motorized. For example, this might be done to film repeat sequences. The image rotator may be used to "dutch" (angle) the camera without adjusting the whole camera or tripod. The available depth of field with the embodiments of the invention is achieved at much lower light levels than other systems, thereby saving both time and money.

Still further, cameras may be practiced in accordance with embodiments of the invention, which comprise a double-swivel optical lens system as described hereinbefore with a zoom lens or macro lens 1812 of the camera 1810. Examples of such video or film cameras are well known to those skilled in the art.

Still further, cameras may be practiced in accordance with embodiments of the invention which comprise a double-swivel optical lens attachment as described hereinbefore with a zoom lens or macro lens of the camera, or a double-swivel optical lens attachment having a macro lens unit with zoom capability. Examples of such video or film cameras are well known to those skilled in the art.

Wide-angle, deep-field, close-focusing optical systems, optical lens attachments and cameras comprising optical lens attachments, double-swivel optical lens system and cameras comprising such double-swivel optical lens systems have been described. While only a small number of embodiments of the invention have been described, in view of this disclosure, it will be apparent to one skilled in the art that modifications and/or substitutions can be made without departing from the scope and spirit of the invention.

I claim:

1. An optical lens attachment, comprising:
   a coupling mechanism for mating engagement with at least one of a camera and an optical lens;
   a barrel coupled at one end to said coupling mechanism;
   a negative lens unit coupled to the other end of said elongated barrel; and
   a diopter lens disposed between said barrel and said coupling mechanism, said coupling mechanism, said diopter lens, and said barrel aligned with an optical axis.

2. The optical lens attachment according to claim 1, wherein said coupling mechanism comprises a threaded, cylindrical member for mating interengagement with a complementary threaded, cylindrical member.

3. The optical lens attachment according to claim 1, wherein said attachment is a straight, forward view barrel-lens attachment.

4. The optical lens attachment according to claim 1, further comprising an inclining prism member disposed said negative lens unit and said barrel, said negative lens unit coupled to an angled surface of said inclining prism member.

5. The optical lens attachment according to claim 4, wherein said inclining prism member comprises a mirror-surfaced dispersion prism.

6. The optical lens attachment according to claim 4, wherein said attachment is an angled-view barrel-lens attachment.

7. The optical lens attachment according to claim 4, wherein the inclining prism member is a 60 degree inclining prism.

8. The optical lens attachment according to claim 1, further comprising a rotation mechanism disposed between said negative lens unit and said coupling mechanism.

9. The optical lens attachment according to claim 8, wherein said rotation mechanism permits 360 degree rotation of said negative lens unit about a longitudinal axis of said barrel.

10. The optical lens attachment according to claim 9, wherein said rotation mechanism comprises a rotating ring assembly coupled between said barrel and said coupling mechanism.

11. The optical lens attachment according to claim 1, wherein said coupling mechanism matingly engages with a zoom lens.

12. The optical lens attachment according to claim 1, further comprising a macro lens unit with zoom capability coupled between said barrel and said coupling mechanism.

13. The optical lens attachment according to claim 1, wherein said barrel has a length between 12 and 18 inches.

14. The optical lens attachment according to claim 1, wherein said negative lens unit comprises positive and negative lens elements, provided the negative lens unit remains negative in overall function.

15. A camera, comprising:
   an optical lens attachment comprising:
      a coupling mechanism for mating engagement with at least one of a camera and an optical lens;
      a barrel coupled at one end to said coupling mechanism;
      a negative lens unit coupled to the other end of said elongated barrel; and
      a diopter lens disposed between said barrel and said coupling mechanism, said coupling mechanism, said diopter lens, and said barrel aligned with an optical axis; and
   a zoom lens, said coupling mechanism matingly engaged with said zoom lens.

16. A camera, comprising:
   an optical lens attachment comprising:
      a coupling mechanism for mating engagement with at least one of a camera and an optical lens;
      a barrel coupled at one end to said coupling mechanism;
      a negative lens unit coupled to the other end of said elongated barrel; and
      a diopter lens disposed between said barrel and said coupling mechanism, said coupling mechanism, said diopter lens, and said barrel aligned with an optical axis; and
   a macro lens unit with zoom capability coupled between said barrel and said coupling mechanism.

* * * * *